3,639,378
POLYMERIZATION OF PROPYLENE WITH A CHROMIUM OXIDE CATALYST ACTIVATED WITH A TRIHYDROCARBON ALUMINUM MODIFIED WITH WATER
Wendell P. Long, Wilmington, Del., assignor to Hercules Incorporated, Wilmington, Del.
No Drawing. Filed Oct. 17, 1969, Ser. No. 867,354
Int. Cl. C08f 3/08, 1/34
U.S. Cl. 260—93.7      12 Claims

ABSTRACT OF THE DISCLOSURE

Propylene is polymerized to isotactic polypropylene in high yields and at a high rate using as the catalyst a chromium oxide extended on a silica and activated with a trihydrocarbon aluminum that has been reacted with 0.05 to 1.5 moles of water and optionally also with 0.05 to 1.5 moles of an alcohol or a phenol, the total amount of water and alcohol or phenol being such that some aluminum-to-carbon bonds remain. Preferably, the chromium oxide-on-silica catalyst is chromic oxide that has been partially reduced to form about 55% to about 90%.

---

This invention relates to an improved process for the polymerization of propylene using a supported chromium oxide catalyst.

It is well known that 1-olefins can be polymerized at low pressure to solid polymers using as the catalyst a Group 6a metal oxide extended on a solid support, e.g., silica, alumina, zirconia or thoria with aluminum trihydrocarbon compounds as cocatalysts, as for example, described in U.S. 2,824,089 to Peters et al. and U.S. 2,944,049 to Edmonds. While these processes are satisfactory for the production of high density polyethylene in good yields, they are impractical for the production of isotactic polypropylene, the polymer being produced, if at all, at only very low rates of polymerization. Attempts have been made to increase the yield of solid polypropylene, as for example, U.S. 3,081,286 to McKinnis, where the aluminum trialkyl is replaced in whole or in part by a dialkylaluminum alkoxide. However, satisfactory rates have still not been achieved.

Now in accordance with this invention, it has been found that by utilizing as the catalyst, chromic oxide, extended on a silica support in combination with trihydrocarbon-aluminum compound reacted with from about 0.05 to about 1.5 moles of water per mole of aluminum compound, it is possible to polymerize propylene and obtain a highly isotactic polymer, in high yields and at a high rate.

The carrier material utilized for preparation of the catalyst can be any silica, alumina, silica-alumina, etc. particulate material which is activated by heat treatment as described in U.S. 2,825,721. Preferably, the carrier will be a non-porous, low bulk density silica.

The carrier is then impregnated with an aqueous solution of chromic acid and after drying in air at about 120° C. is heated at a higher temperature to remove additional water and in the presence of oxygen to maintain a high oxidation state of the chromium. Instead of using chromic acid for loading the support with chromium, there can be used any water-soluble salt, such as chromic nitrate, which is converted to chromic oxide when heated at elevated temperature in the presence of oxygen. The amount of chromium loaded on the silica support is not critical and generally will be within the range of from about 0.01% by weight of the support to about 10%. For use in the process of this invention the supported chromic oxide catalyst is preferably partially reduced. It is well known that neither the wholly hexavalent chromium or wholly divalent chromium oxides are effective as catalysts for the preparation of isotactic polypropylene, but even these oxides are operable catalysts when the aluminum trihydrocarbon compound reacted with 0.05 to 1.5 moles of water is used as activator. However, for optimum rates and yield of isotactic polymer, the chromium is preferably reduced from the hexavalent state to an average valence level of at least about 4 to about 2.4, and preferably to about 3, i.e., a reduction level between about 55% and 90%, and preferably from about 65 to about 75%.

The reduction of the chromic oxide can be carried out by a variety of means. The most effective means of doing so is by controlled reduction of the supported chromic oxide catalyst with carbon monoxide, the amount of reduction being measured by the $CO_2$ evolved or the CO used. The temperature at which this controlled reduction is carried out should be in the range of about 175° to 300° C. since at higher temperatures, e.g., 500° C., the reduction goes uncontrollably fast to $Cr^{++}$. The reduction can also be carried out by means of hydrogen. Still another means of reducing the chromic oxide is by treating the catalyst with an aliphatic, cycloaliphatic or alkyl-substituted aromatic hydrocarbon that is free of aliphatic unsaturation to a temperature of about 20° to 150° C. The hydrocarbon used can be the same or different from that used for the polymerization process. Exemplary of such hydrocarbons are pentane, hexane, heptane, octane, isooctane, decane, cyclohexane, methylcyclohexane, benzene, toluene, xylene, etc.

Any aluminum trihydrocarbon compound modified with water can be used to activate the chromium-on-silica catalysts of this invention. Exemplary of the aluminum trihydrocarbons that can be utilized are compounds having the formula $AlR_3$ where the R's can be alike or different and are selected from alkyl, alkenyl, cycloalkyl, cycloalkenyl, alkylcycloalkyl, alkenylcycloalkyl, aryl, aralkyl, and alkaryl, as for example, trimethylaluminum, triethylaluminum, tri(n-butyl)aluminum, triisobutylaluminum, trihexylaluminum, trioctylaluminum, tridodecylaluminum, aluminum isoprenyl, triphenylaluminum, tribenzylaluminum, tri(cyclohexyl)aluminum, etc. The amount of aluminum trihydrocarbon that is used should be such an amount that the molar ratio of aluminum compound to chromium oxide used in the polymerization will be at least 0.1:1, and preferably from about 1:1 to about 10:1, although ratios as high as 100:1 can be used, the higher aluminum to chromium ratios not adversely affecting the rate and in some cases giving improved stereospecificity of the polymerization.

As already stated, the trihydrocarbon aluminum compound is reacted with water in a molar ratio of water to aluminum compound of from about 0.05 to about 1.5, and preferably from about 0.2 to about 1.0. The water can be reacted with the aluminum compound in situ or it can be pre-reacted and then used in the polymerization process. The latter can be done by adding the desired amount of water to a hydrocarbon solution of the aluminum compound, or the aluminum compound can be added to a hydrocarbon diluent containing the desired amount of water.

The exact nature of this reaction product of the organoaluminum compound with the above-specified amount of water is not known. As pointed out, the amount of water reacted with the organoaluminum compound is critical to produce the superior cocatalyst in accordance with this invention. It is believed that a reaction rather than a complex formation takes place. When a trialkylaluminum compound is reacted with water, it has been found that a very rapid and complete reaction occurs to liberate 2 moles of alkane per mole of water. Thus, with triethylaluminum, 2 moles of ethane per mole of water are liberated. The products are believed to be organoaluminum oxide type of compounds, as, for example,

etc. These compounds are probably somewhat associated in organic media. The most active or preferred species is probably the polymeric species where there is about one R group per Al. Regardless of what the theory may be, the reaction product obtained when an organoaluminum compound is reacted with from about 0.05 mole to about 1.5 moles of water per mole of aluminum compound is an outstanding activator for the supported chromium oxide catalyst in the polymerization of propylene.

The yield of isotactic polypropylene can further be enhanced without reducing the rate of the polymerization by reacting the water-modified aluminum compound with an alcohol or a phenol. Any alcohol can be used to modify the hydrocarbon aluminum-water activator as, for example, aliphatic alcohols such as methanol, ethanol, isopropanol, n-butanol, tert-butanol, amyl alcohol, tert-amyl alcohol, hexanol, 1-octanol, 2-octanol, 2-ethylhexanol, 1-decanol, etc., cycloaliphatic alcohols such as cyclohexanol, α-terpineol, menthol, α-fenchyl alcohol, borneol, aralkyl alcohols such as benzyl alcohol, α-phenylethanol, diphenylmethanol, triphenylmethanol, etc., and polyhydric alcohols such as ethylene glycol, propylene glycol, glycerol, pentaerythritol, cyclohexandiol, etc. In the same way, any phenol can be used as, for example, phenol, resorcinol, a cresol, di-tert.-butyl-p-cresol, etc. Mixtures of these alcohols and phenols can also be used. The amount of the alcohol or phenol used to modify the hydrocarbon aluminum-water activator will be within the range of from about 0.05 to about 1.5 moles per mole of aluminum compound, and preferably from about 0.4 to about 1.0 mole per mole of aluminum compound.

The alcohol or phenol can be reacted with the water-modified trihydrocarbon aluminum in a variety of ways. It can be added during or after the addition of the water to the trihydrocarbonaluminum. It can be added as a pure compound or added as a solution in a suitable diluent, as, for example, the hydrocarbon diluent being used in the polymerization process.

As already stated above, the water and the alcohol or phenol modifying agents are used in a molar ratio of from about 0.05 to about 1.5 moles per mole of trihydrocarbon aluminum, but the total of these two types of modifying agents must be an amount such that at least some aluminum-to-carbon bonds remain in the activator for the chromium catalyst.

The polymerization can be carried out by any desired means which can be a batch or continuous process. Preferably, it will be carried out in the presence of a liquid diluent such as a liquid hydrocarbon which can be any aliphatic, cycloaliphatic or aromatic hydrocarbon free of ethylenic unsaturation. Exemplary of such solvents are pentane, hexane, heptane, isooctane, decane, cyclohexane, benzene, toluene, xylene, etc. A mixture of the propylene and liquid hydrocarbon can be allowed to flow over a fixed catalyst bed or the propylene can be passed into a suspension of the catalyst in the liquid hydrocarbon. In the latter case, the amount of the catalyst used can vary widely but generally will be about 0.05 to about 0.5 g. per 100 ml. of diluent.

The polymerization can be carried out at any temperature of from about 0 to about 120° C., preferably from about 20 to about 80° C. and more preferably from about 40 to about 60° C., under a pressure of from subatmospheric to as high as 30 atm. or more.

The following examples illustrate the process of this invention. All parts and percentages are by weight unless otherwise indicated.

PREPARATION OF THE CARRIER

A commercial pyrogenic silica support having a surface area of from 150 to 380 square meters per gram was annealed at 750° C. for 70 hours in dry air and then was rehydrated with water at 100° C. overnight.

PREPARATION OF THE CATALYST

An aqueous solution of chromic oxide was added to the rehydrated silica in an amount to give the desired chromic oxide loading, along with sufficient additional water to give a viscous syrup. The viscous mass was first dried in air with stirring at room temperature and then by a stream of air at 120° C. for 16 hours and finally at 260° C. for 30 minutes. The dried mass was then calcined under a stream of oxygen at 500° C. for 30 minutes. The chromic oxide on silica was used as such or reduced by heating in an oven at temperatures from 185 to 260° C. while passing CO through for varying times. The extent of reduction was calculated from the $CO_2$ evolved. At the desired reduction level, the CO was displaced at 200–260° C. by argon and the catalyst was stored in an argon-flushed storage bottle.

POLYMERIZATION

The polymerizations were carried out in n-heptane as the diluent which was charged to the polymerization vessel by passing it through a column of 60–200 mesh silica gel directly into the capped vessel which was simultaneously being sparged with argon. The catalyst was then added under argon, avoiding any exposure of either the diluent or catalyst to air. Generally, the amount of catalyst used was sufficient to provide 0.01 to 0.07 millimoles of chromium per 100 ml. of the diluent. The polymerization vessel and contents were equilibrated at 50° C., activator, if used, was injected, and then propylene was admitted to 40 p.s.i.g. without venting the argon. After stirring for 16 hours at 50° C., the vessel was vented and cooled. The polymer and solids were separated by filtration, washed with heptane and dried at room temperature for 16 hours. The yield of insoluble polymer was obtained by correcting for the weight of the catalyst support originally added. In every case the insoluble polymer produced was highly isotactic, i.e., stereoregular, polypropylene. An aliquot of the heptane solution was dried to determine the yield of soluble polymer produced.

Examples 1–3

These examples demonstrate the increase in the rate of polymerization, expressed as total grams of polymer produced, i.e., soluble and insoluble polymer, per millimole of chromium per atmosphere of propylene per hour (g./mmol. Cr/atm./hr.), by the addition of triethylaluminum modified with various amounts of water. The supported catalyst used contained 0.28% chromic oxide which was used without reduction in Example 1, was reduced 70% in Example 2 and reduced 93% in Example 3. In these examples the water-modified triethylaluminum activators were prepared by adding triethylaluminum to a suitable volume of heptane saturated with water at room temperature. The mixture was allowed to stand at room temperature for about 30 minutes prior to adding it to the supported chromium oxide in heptane suspension. Because the exact structure of these water-modified trihydrocarbon aluminum compounds is not known, the formulae used in these and the following examples is that of the trihydrocarbon aluminum compound with the molar amount of water reacted based on one mole of the aluminum compound, i.e., one mole of triethylaluminum reacted with 0.5 mole of water is shown as $(C_2H_5)_3Al \cdot 0.5H_2O$. Tabulated below are the activator used, the amount of activator shown as the molar ratio of Al:Cr. The percent insoluble polypropylene produced, i.e., percent of the total polymer, and the rate of polymerization in g./mmol. Cr/atm./hr., together with the data on controls where no activator was used and where triethylaluminum which has not been reacted with water is used.

TABLE I

| Activator | | Molar ratio, Al:Cr | Polypropylene produced | |
|---|---|---|---|---|
| | | | Percent insoluble | Rate |
| Example 1 (0% reduction of chromic oxide): | | | | |
| Control | None | | | 0 |
| A | $(C_2H_5)_3Al\cdot 0.5H_2O$ | 6.1 | 35 | 4.1 |
| B | $(C_2H_5)_3Al\cdot 1.0H_2O$ | 6.1 | 38 | 5.5 |
| Example 2 (70% reduction of chromic oxide): | | | | |
| Control | None | | 27 | 0.24 |
| Control | $(C_2H_5)_3Al$ | 7.0 | 47 | 2.0 |
| A | $(C_2H_5)_3Al\cdot 0.2H_2O$ | 5.5 | 36 | 3.8 |
| B | $(C_2H_5)_3Al\cdot 0.5H_2O$ | 5.8 | 36 | 5.0 |
| C | $(C_2H_5)_3Al\cdot 0.75H_2O$ | 5.4 | 36 | 4.8 |
| D | $(C_2H_5)_3Al\cdot 1.0H_2O$ | 5.9 | 35 | 7.0 |
| E | $(C_2H_5)_3Al\cdot 1.24H_2O$ | 6.5 | 32 | 8.8 |
| Example 3 (93% reduction of chromic oxide): | | | | |
| Control | None | | 32 | 0.4 |
| A | $(C_2H_5)_3Al\cdot 0.50H_2O$ | 6.0 | 38 | 1.2 |

Examples 4 to 9

These examples illustrate the increased stereospecificity of the water-modified trihydrocarbon aluminum compounds when they are further reacted with an alcohol or phenol in comparison with a control run where triethylaluminum, which had not been reacted with water, was reacted with butanol alone.

The water-modified triethylaluminum was prepared as described in the previous examples. The desired amount of the alcohol or phenol was then added to the solution of water-modified triethylaluminum as a 1 M solution in heptane. In Example 4, the chromic oxide catalyst was used without reduction and in Examples 5 to 9 it was 70% reduced. The data for each run is tabulated in Table II.

TABLE II

| Activator | | Molar ratio, Al:Cr | Polypropylene produced | |
|---|---|---|---|---|
| | | | Percent insoluble | Rate |
| 0% reduction of chromic acid: | | | | |
| Control | $(C_2H_5)_3Al\cdot 1.0$ butanol | 11 | | <0.1 |
| | $(C_2H_5)_3Al\cdot 0.5H_2O$ | 6.1 | 35 | 4.1 |
| Ex. 4 | $(C_2H_5)_3Al\cdot 0.5H_2O\cdot 0.4$ butanol | 5.9 | 48 | 3.8 |
| 70% reduction of chromic acid: | | | | |
| | $(C_2H_5)_3Al\cdot 0.5H_2O$ | 7.5 | 50 | 6.1 |
| Ex. 5 | $(C_2H_5)_3Al\cdot 0.5H_2O\cdot 0.7$ n-butanol | 6.2 | 45 | 11.2 |
| Ex. 6 | $(C_2H_5)_3Al\cdot 0.5H_2O\cdot 0.8$ methanol | 6.8 | 48 | 8.7 |
| Ex. 7-A | $(C_2H_5)_3Al\cdot 0.5H_2O\cdot 0.4$ tert-amyl alcohol | 8.8 | 61 | 18.4 |
| Ex. 7-B | $(C_2H_5)_3Al\cdot 0.5H_2O\cdot 0.8$ tert-amyl alcohol | 6.2 | 62 | 14.1 |
| Ex. 8 | $(C_2H_5)_3Al\cdot 0.5H_2O\cdot 0.8$ α-phenylethanol | 7.7 | 61 | 7.0 |
| Ex. 9 | $(C_2H_5)_3Al\cdot 0.5H_2O\cdot 0.8$ phenol | 7.0 | 43 | 13.1 |

Example 10

In this example the water-modifide trihydrocarbon aluminum compound was prepared in situ.

The general procedure utilized in Examples 1-3 was repeated except water was added to the n-heptane in the polymerization vessel prior to introduction of the supported chromic oxide catalyst, which in this case was 70% reduced with carbon monoxide. Then after standing about 30 minutes the triethylaluminum was added, followed by propylene as previously described. The amount of water added to the heptane was equal to one mole per mole of triethylaluminum used. The data for this run along with a control run is tabulated below.

| Activator | | Molar ratio, Al:Cr | Molar ratio, $H_2O$:Cr | Polypropylene produced | |
|---|---|---|---|---|---|
| | | | | Percent insoluble | Rate |
| Control | $(C_2H_5)_3Al$ | 7.0 | | 47 | 2.0 |
| Ex. 10 | $(C_2H_5)_3Al\cdot 1.0H_2O$ | 4.8 | 4.8 | 37 | 3.6 |

What I claim and desire to protect by Letters Patent is:

1. In the process of producing solid polypropylene by contacting propylene with a supported chromium oxide catalyst and activating the catalyst by the addition of a trihydrocarbon aluminum compound in an amount such that the molar ratio of the aluminum compound to the chromium oxide is at least about 0.1:1, the improvement wherein the trihydrocarbon aluminum compound is reacted with water in a molar ratio of water to said aluminum compound within the range of from about 0.05 to about 1.5.

2. The process of claim 1 wherein the catalyst support is a silica support.

3. The process of claim 2 wherein the supported chromium oxide catalyst is chromic oxide.

4. The process of claim 2 wherein the supported chromium oxide catalyst is chromic oxide reduced by carbon monoxide to from about 55 to about 90%.

5. The process of claim 4 wherein the trihydrocarbon aluminum compound is a trialkylaluminum.

6. The process of claim 1 wherein the aluminum compound and water are reacted prior to use in the polymerization process.

7. The process of claim 1 wherein the aluminum compound and water are reacted in situ.

8. In the process of producing solid polypropylene by contacting propylene with a supported chromium oxide catalyst and activating the catalyst by the addition of a trihydrocarbon aluminum compound in an amount such that the molar ratio of the aluminum compound to the chromium oxide is at least about 0.1:1, the improvement wherein the trihydrocarbon aluminum compound is reacted with water in a molar ratio of water to said aluminum compound within the range of from about 0.05 to about 1.5 and with alcohol or a phenol in a molar ratio of said alcohol or phenol to said aluminum compound within the range of from about 0.05 to about 1.5, the total amount of said water and alcohol or phenol being such that at least some aluminum-to-carbon bonds remain.

9. The process of claim 8 wherein the trialkylaluminum is reacted with water and an alkanol.

10. The process of claim 9 wherein the alkanol is n-butanol.

11. αhe process of claim 9 wherein the alkanol is tert.-amyl alcohol.

12. The process of claim 8 wherein the trialkylaluminum is reacted with water and phenol.

References Cited

UNITED STATES PATENTS

| 2,824,089 | 2/1958 | Peters et al. | 260—94.9 D |
| 3,242,099 | 3/1966 | Manyik et al. | 260—94.9 E |
| 3,362,946 | 1/1968 | Hogan | 260—94.9 D |

JOSEPH L. SCHOFER, Primary Examiner

A. HOLLER, Assistant Examiner

U.S. Cl. X.R.

252—458; 260—94.9 C, 94.9 D